US012273725B2

(12) United States Patent
Dunn et al.

(10) Patent No.: US 12,273,725 B2
(45) Date of Patent: Apr. 8, 2025

(54) MOBILE SUBSCRIBER IDENTITY ROTATION

(71) Applicant: Private Tech Inc., Washington, DC (US)

(72) Inventors: David Seth Dunn, Washington, DC (US); Christopher William Stokes, Alexandria, VA (US); Nicholas John Espinoza, Accokeek, MD (US); Stephen James Dowhy, Washington, DC (US); Clifford Marcus Owenby, Heath, TX (US); John McKinstry Doyle, Washington, DC (US)

(73) Assignee: Private Tech Inc., Washington, DC (US)

( * ) Notice: Subject to any disclaimer, the term of this patent is extended or adjusted under 35 U.S.C. 154(b) by 223 days.

(21) Appl. No.: 18/308,004

(22) Filed: Apr. 27, 2023

(65) Prior Publication Data
US 2024/0365126 A1 Oct. 31, 2024

(51) Int. Cl.
*H04W 12/06* (2021.01)
*H04W 12/72* (2021.01)

(52) U.S. Cl.
CPC ........... *H04W 12/72* (2021.01); *H04W 12/06* (2013.01)

(58) Field of Classification Search
None
See application file for complete search history.

(56) References Cited

U.S. PATENT DOCUMENTS

| 8,862,888 | B2 * | 10/2014 | Tolba | H04L 9/0866 |
| | | | | 713/172 |
| 9,332,000 | B2 * | 5/2016 | Lei | H04L 63/0815 |
| 10,129,020 | B2 | 11/2018 | Le Saint | |
| 11,455,621 | B2 | 9/2022 | Bouse | |
| 11,544,737 | B2 | 1/2023 | Eich et al. | |
| 2012/0159154 | A1 * | 6/2012 | Que | H04L 63/0853 |
| | | | | 713/155 |

(Continued)

FOREIGN PATENT DOCUMENTS

KR 10-2023-0031192 A 3/2023

OTHER PUBLICATIONS

PCT International Search Report and Written Opinion, PCT Application No. PCT/US2024/018919, Jun. 28, 2024, 12 pages.

*Primary Examiner* — Trang T Doan
(74) *Attorney, Agent, or Firm* — Fenwick & West LLP (57) ABSTRACT

A mobile device performs authentication with blinded tokens and swaps its international mobile subscriber identity (IMSI) value. For authentication with blinded tokens, the mobile device generates a blinded token and provides it to a server to encrypt. To redeem the token, the mobile device unblinds the encrypted blinded token and provides it to the server along with a public key. To complete authentication, the mobile device receives, from the server, a nonce encrypted with the public key and decrypts the nonce with a private key. For swapping its IMSI value, the mobile device retrieves two eSIM profiles with corresponding IMSI values and configures the first of the two profiles as active. In response to a trigger, the mobile device changes the active profile from the first to the second, swaps the first IMSI value with a new IMSI value, and changes the active profile back to the first profile.

20 Claims, 8 Drawing Sheets

(56) References Cited

U.S. PATENT DOCUMENTS

| | | | |
|---|---|---|---|
| 2014/0171029 A1* | 6/2014 | Holtmanns | H04W 12/40 455/411 |
| 2020/0288298 A1 | 9/2020 | Li et al. | |
| 2022/0232388 A1 | 7/2022 | Seo et al. | |
| 2023/0171586 A1* | 6/2023 | Holmes | H04W 8/186 455/435.1 |
| 2023/0292127 A1* | 9/2023 | Raghavan | H04W 12/08 |
| 2023/0308277 A1 | 9/2023 | Van Cleve et al. | |

* cited by examiner

MOBILE SUBSCRIBER IDENTITY ROTATION

TECHNICAL FIELD

The disclosure generally relates to the field of mobile devices, and specifically to device authentication and security.

BACKGROUND

Entities who provide services to users may employ authentication techniques to verify the identity of users and the validity of user requests. In some cases, a user may provide to an entity a proof that the user requested a service (e.g., a receipt). The user may then prove their identity by providing the entity with identifying information. For example, the user may provide the entity with a username and password. However, this technique requires that the user expose their identifying information (username or password) to the entity, which both poses a risk to the user's privacy and requires that the user put trust in the entity to protect their information. A user may use a mobile device such as a mobile phone to authenticate a user request. When mobile devices connect to a network, an international mobile subscriber identity (IMSI) value is provided as part of authentication. The static nature of IMSI values and their unencrypted transmission, for example during initial network attach, exposes the mobile device to unauthorized tracking, thus posing an additional risk to the user's privacy.

SUMMARY

A method of mobile device authentication with blinded tokens is described herein. A blinded token is a token used in a blind signature scheme. In a blind signature scheme, one party can perform a signing operation without knowledge of what they are signing. A mobile device may perform an authentication process with a blinded token, in which the mobile device proves to a security server the possession of a validated receipt identifier (receipt ID) without having to reveal the identity of the mobile device. This method increases the level of security in the exchange between the mobile device and the security server, removing the need for the mobile device to "trust" the security server, allowing for sensitive information to be shared without compromising the sensitive information, and allowing the mobile device to maintain anonymity.

In one or more embodiments, the mobile device receives a receipt ID from an authentication server. The mobile device generates a blinded token representative of a request for service for a period of time and provides the blinded token along with the receipt ID to the security server, which encrypts the blinded token and provides it back to the mobile device. The mobile device unblinds the encrypted blinded token and provides the encrypted unblinded token along with a public key to the security server, which validates the encrypted blinded token and stores the public key. The mobile device receives a nonce from the security server. The mobile device encrypts the nonce with a private key that corresponds to a public key. The mobile device provides the encrypted nonce with the public key back to the security server, which verifies the decrypted nonce and provides the mobile device with an authentication token.

A method of swapping the international mobile subscriber identity (IMSI) value of a mobile device is described herein. The method swaps IMSI values in response to triggers in order to improve the privacy of the user of the mobile device to avoid compromising user experience. One example trigger may be when the mobile device has been screen locked for sixty seconds. Another example trigger may be after the user ends a phone call.

In one or more embodiments, the mobile device retrieves a first eSIM profile and a second eSIM profile, the profiles are associated with a first IMSI value and second IMSI value respectively. The mobile device configures the first eSIM profile as an active eSIM profile. In response to a first triggering criteria, the mobile device changes the active eSIM profile from the first eSIM profile to the second eSIM profile. The mobile device requests a third IMSI value from a security server and, in response to receiving the third IMSI value, modifies the first eSIM profile by replacing the first IMSI value with the third IMSI value. In response to a second triggering criteria, the mobile device changes the active eSIM profile from the second eSIM profile back to the first eSIM profile.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
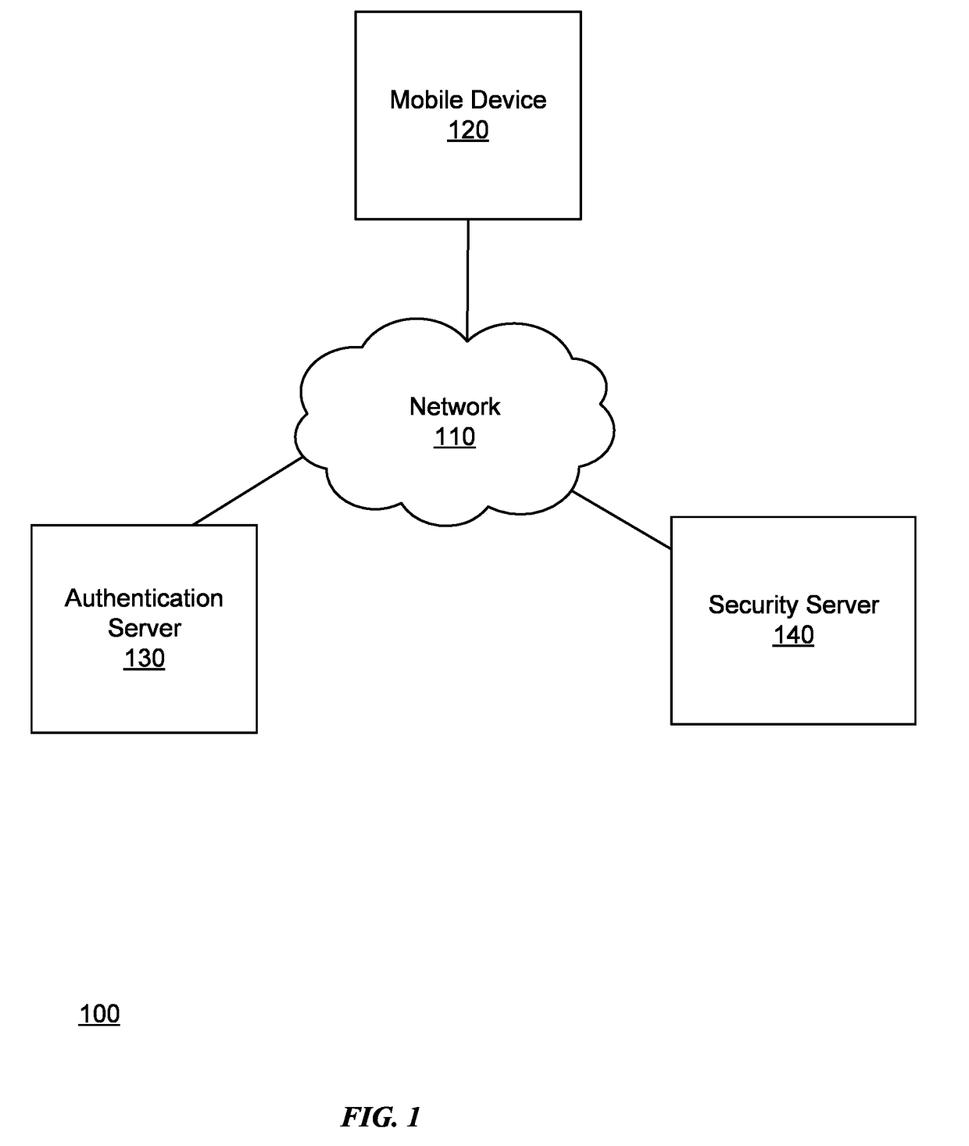
FIG. 1 illustrates one embodiment of a system environment for mobile device authentication with blinded tokens and IMSI value swapping.

FIG. 1 illustrates one embodiment of a system environment for mobile device authentication with blinded tokens and IMSI value swapping. As depicted in FIG. 1, environment 100 includes network 110, mobile device 120, authentication server 130, and security server 140. While only one of each feature of environment is depicted, this is for convenience only, and any number of each feature may be present. Where a singular article is used to address these features, scenarios where multiples of those features are referenced are within the scope of what is disclosed.

Network 110 provides connections to the components of the system environment 100 through one or more sub-networks, which may include any combination of local area and/or wide area networks, using both wired and/or wireless communication systems. In some embodiments, network 110 uses standard communications technologies and/or protocols. For example, network 110 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via network 110 include gRPC, multiprotocol label switching (MPLS), transmission control protocol/Internet protocol (TCP/IP), hypertext transport protocol (HTTP), simple mail transfer protocol (SMTP), and file transfer protocol (FTP). Data exchanged over network 110 may be represented using any suitable format, such as hypertext markup language (HTML), extensible markup language (XML), JavaScript object notation (JSON), structured query language (SQL). In some embodiments, some of the communication links of network 110 may be encrypted using any suitable technique or techniques such as secure sockets layer (SSL), transport layer security (TLS), virtual private networks (VPNs), Internet Protocol security (IPsec), etc. Network 110 also includes links and packet switching networks such as the Internet. In some embodiments, a data store belongs to part of the internal computing system of a server. In such cases, network 110 may be a local network that enables the server to communicate with the rest of the components.

Mobile device 120 is a mobile device through which a user may make requests for services from security server 140 or authentication server 130 over network 110. Examples of mobile device 120 may be a smartphone, tablet, computer, satellite phone, Internet of Things (IoT) device, smart watch, or other mobile-enabled device. Mobile device 120 may be a mobile cellular device and may contain a subscriber identity module (SIM) card, embedded subscriber identity module (eSIM) card, or integrated subscriber identity module (iSIM). The SIM or eSIM card has a corresponding SIM or eSIM profile, which stores the unique identity of the subscriber. For example, the profile may store network connectivity information, key information, and authentication information for the mobile device 120 as well as any corresponding network settings. The profile contains an international mobile subscriber identity (IMSI) value, a unique identifier that identifies the subscriber (e.g., user of mobile device 120). When mobile device 120 connects to a network, it provides the IMSI value to the network during authentication of the mobile device. In some embodiments, more than one eSIM profile may reside on mobile device 120. In some embodiments, mobile device 120 executes a carrier application to communicate with the security server 140. The operations of mobile device 120 are described in further detail below with reference to at least FIG. 2.

Authentication server 130 is a computing server that processes requests for service from mobile device 120. Authentication server 130 may store information relevant to the request, such as a receipt identifier (receipt ID). A receipt ID is an identifier that corresponds to the requested service and comprises a cryptographically secured value. In some embodiments, authentication server 130 may randomly generate the receipt ID. Authentication server 130 may perform a validation of the receipt ID upon request, for example in response to a request from security server 140. In some embodiments, authentication server 130 may be a third-party server. The operations of authentication server 130 are described in further detail below with respect to at least FIG. 4A.

Security server 140 is a computing server that may facilitate processes such as authenticating mobile device 120 with blinded tokens or swapping IMSI values of mobile device 120. Security server 140 may receive data from mobile device 120 or from authentication server 130. In some embodiments, security server 140 may have a heightened security standard and an isolated environment for connecting with mobile device 120 and reviewing data from mobile device 120 that may include personally identifiable information or other sensitive information. The operations of security server 140 are described in further detail below with reference to at least FIG. 3.

Mobile Device

Figure 2:
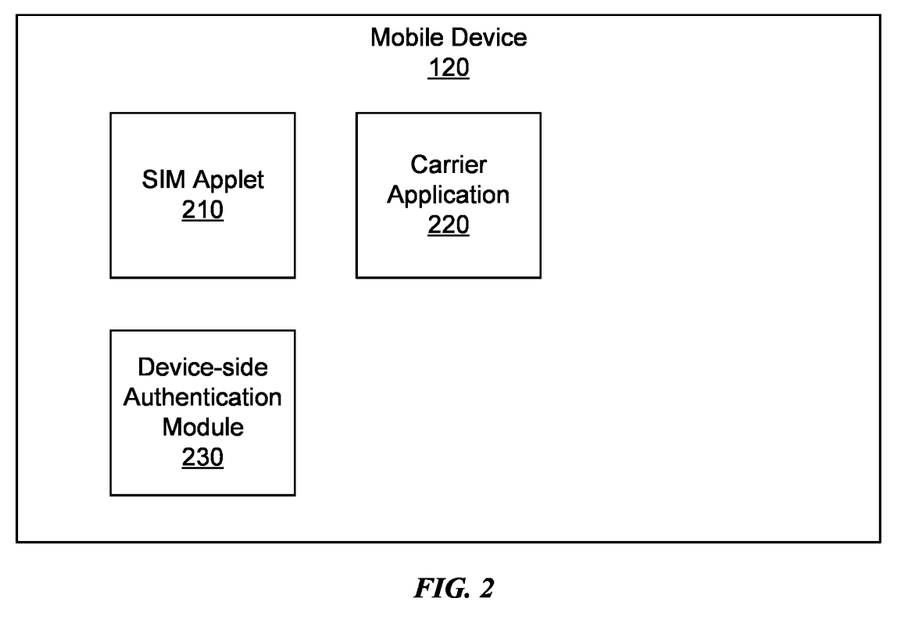
FIG. 2 illustrates one embodiment of exemplary modules operated by a mobile device.

FIG. 2 illustrates one embodiment of exemplary modules operated by a mobile device. As depicted in FIG. 2, mobile device 120 includes SIM applet 210, carrier application 220, and device-side authentication module 230. The modules depicted with respect to mobile device 120 are merely exemplary; fewer or additional modules may be used to achieve the activity disclosed herein. Moreover, the modules of mobile device 120 typically reside in mobile device 120, but in various embodiments may instead, in part or in whole, reside in security server 140.

SIM applet 210 is a small program inside the embedded sim card (eSIM) of mobile device 120, installed on an eSIM profile. SIM applet 210 provides a way for other applications, such as carrier application 220, to access information pertaining to the eSIM (e.g., network quality, device status) and to modify the eSIM profile it is installed on. In some embodiments, more than one eSIM profile may reside on mobile device 120. In this case, each eSIM profile has a copy of the SIM applet 210. Carrier application 220 may configure one eSIM profile of many stored eSIM profiles to be an active eSIM profile. Carrier application 220 may at any point replace the active eSIM profile with another eSIM profile.

Carrier application 220 is an application on mobile device 120 that may provide mobile carrier services to the user of mobile device 120. For example, carrier application 220 may allow the user of mobile device 120 to connect wirelessly to a network, make phone calls, or use cellular data. Carrier application 220 may communicate with SIM applet 210 and may access or modify information such as the one or more eSIM profiles. For example, carrier application 220 may download an eSIM profile, configure an eSIM profile as active, or transmit an application protocol data unit (APDU) command to change the IMSI value of an eSIM profile. Carrier application 220, via the security server 140, may also modify or add to the contents of an IMSI table, a table that associates an IMSI value with mobile device 120 or an eSIM profile on mobile device 120. The IMSI table may commonly reside in or be a subcomponent of a home subscriber server (HSS).

Device-side authentication module 230 seeks authentication of mobile device 120 with blinded tokens. Device-side authentication module 230 may generate values at various stages in the process. For example, device-side authentication module 230 may generate a token, a recovery identifier (RID), a public key, or a private key. A token may be a randomly generated number representative of mobile device 120. The token may be epoch-specific, in that the token is specific to a time interval in which device-side authentication module 230 generated the token. A RID is a unique value known only to mobile device 120 that may serve as a unique identity for mobile device 120. A public key is a publicly known cryptographic key that can be used by any party to encrypt messages for receival by a party that has access to the public key's corresponding private key. The private key corresponds to the public key and allows the party to decrypt messages encrypted with the public key. Device-side authentication module 230 may manipulate the generated values or apply cryptographic techniques. Device-side authentication module 230 may blind or unblind values (e.g., blinding a token, unblinding an encrypted blinded token) or may decrypt values (e.g., decrypting a nonce with a private key). Further details of the method of mobile device authentication are discussed in FIGS. 4A-C and FIG. 5.

Security Server

Figure 3:
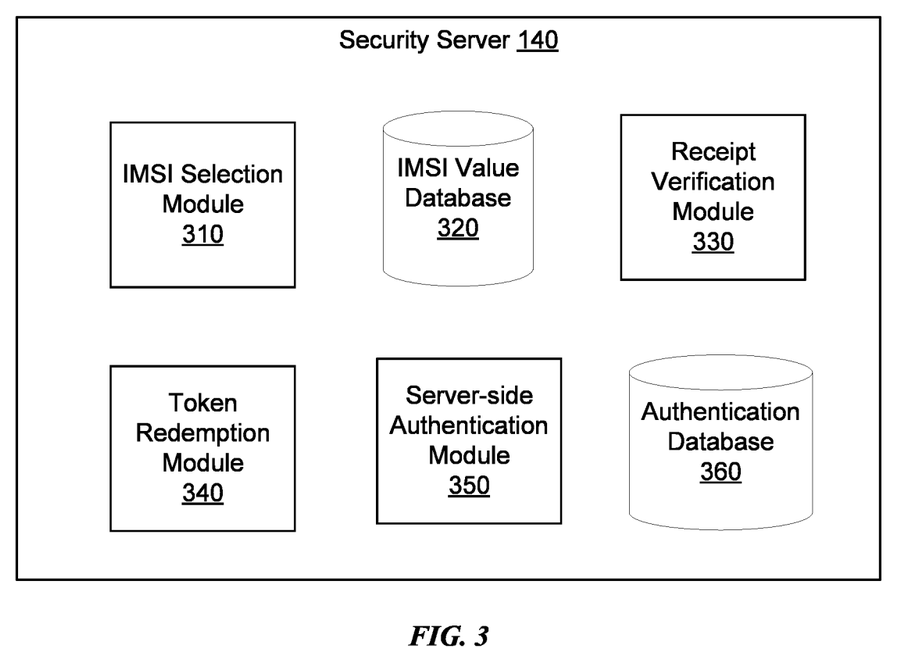
FIG. 3 illustrates one embodiment of exemplary modules operated by a security server.

FIG. 3 illustrates one embodiment of exemplary modules operated by a security server. As depicted in FIG. 3, security server 140 includes IMSI selection module 310, IMSI value database 320, receipt verification module 330, token redemption module 340, server-side authentication module 350, and authentication database 360. The modules depicted with respect to security server 140 are merely exemplary; fewer or additional modules may be used to achieve the activity disclosed herein. Moreover, the modules of security server 140 typically reside in security server 140, but in various embodiments may instead, in part or in whole, reside in mobile device 120.

IMSI selection module 310 performs tasks in support of the IMSI swapping process, including selecting IMSI values, transmitting IMSI values to mobile device 120, and updating IMSI value database 320. In some embodiments, IMSI selection module 310 selects IMSI values unprompted by mobile device 120. In some embodiments, IMSI selection module 310 selects IMSI values in response to a request by mobile device 120. IMSI selection module 310 may update IMSI value database in order to associate mobile device 120 with an IMSI value, such as the selected IMSI value. In some embodiments, IMSI selection module 310 may associate mobile device 120 with an IMSI value by de-associating mobile device 120 with a previously used IMSI value.

IMSI value database 320 stores a corpus of IMSI values for use in the IMSI swapping process. In some embodiments, the corpus of IMSI values comprises IMSI values available to a set of mobile devices including mobile device 120. In some embodiments, the corpus of IMSI values contains a greater number of IMSI values than the number of mobile devices in the set of mobile devices. In some embodiments, a set of IMSI values in the corpus of IMSI values may be IMSI values previously selected for use in mobile device 120 or other mobile devices in the set of mobile devices.

Receipt verification module 330 verifies a receipt ID corresponding to a request from mobile device 120. The request may be between mobile device 120 and authentication server 130. The request may include a request for service, such as a request for mobile device 120 to be provided with a cellular network. In response to the request, mobile device 120 may receive a confirmation of the request in the form of a receipt ID from authentication server 130. Receipt verification module 330, responsive to receiving the receipt ID from mobile device 120, communicates with authentication server 130 to verify the receipt. Receipt verification module 330 may check and/or modify data stored on security server 140, such as one or more tables stored in authentication database 360. Receipt verification module 330 may also engage in an RSA signing process, receiving a blinded token from mobile device 120, encrypting the blinded token in response to the verification of the receipt ID, and providing the token to the user. Further details of the method of receipt verification are discussed in FIG. 4A.

Token redemption module 340 processes a request from mobile device 120 to redeem a token. A token serves as proof that mobile device 120 requested a service and that security server 140, through receipt verification module 330, verified the receipt corresponding to the service. Token redemption module 340 redeems the token by using tables stored in authentication database 360 to check the token's validity and record the use of the token. Token redemption module 340 may receive and store a public key provided by mobile device 120. Further details for the token redemption process are discussed in FIG. 4B.

Server-side authentication module 350 authenticates mobile device 120 using a public key authentication process. A public key authentication process is a process where encryption and decryption are performed using separate keys, a public key known to both security server 140 and mobile device 120 and a private key known only to mobile device 120. Server-side authentication module 350 may authenticate mobile device 120 in response to a request for a service (e.g., the service mobile device requested which produced the receipt). Further details of the authentication process are discussed in FIG. 4C.

Authentication database 360 stores various blacklists and tables associated with the method of mobile device authentication with blinded tokens. Tables may include a receipt ID blacklist, a receipt authentication table, a token blacklist, a public key table, an authentication nonce table, or an authentication token table.

Mobile Device Authentication with Blinded Tokens

Figure 4A:
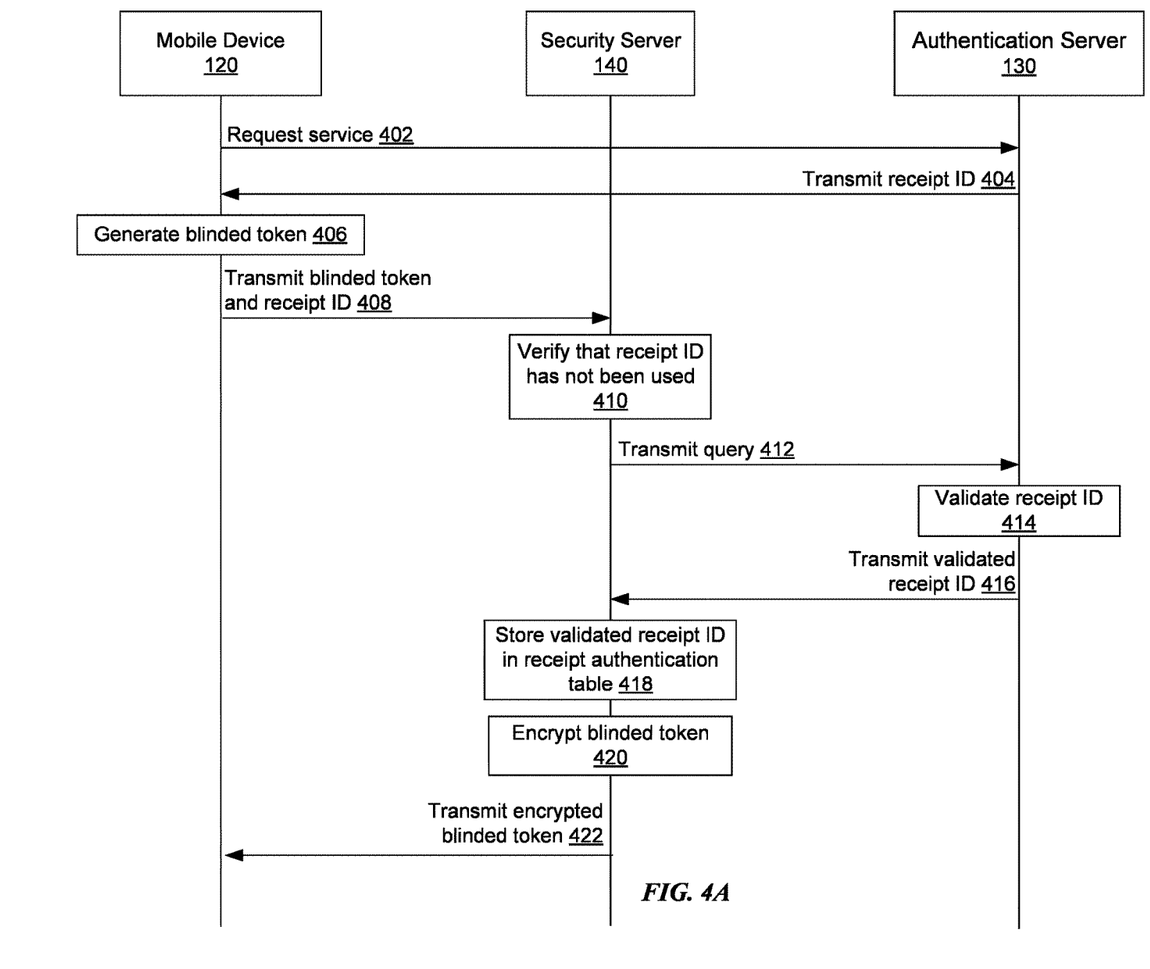
FIGS. 4A-C illustrates an interaction diagram depicting a computer-implemented process for mobile device authentication with blinded tokens, in accordance with some embodiments.
Figure 4B:
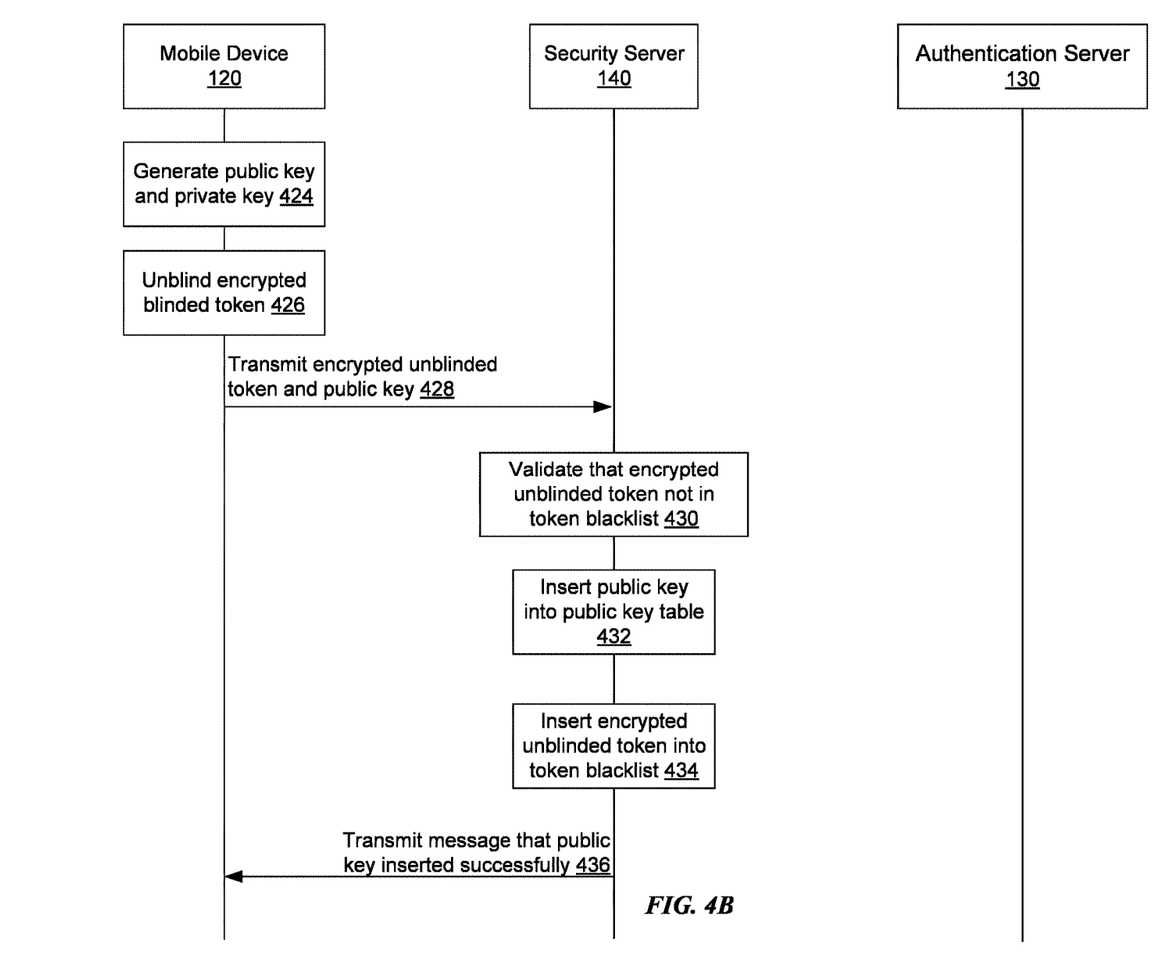
Figure 4C:
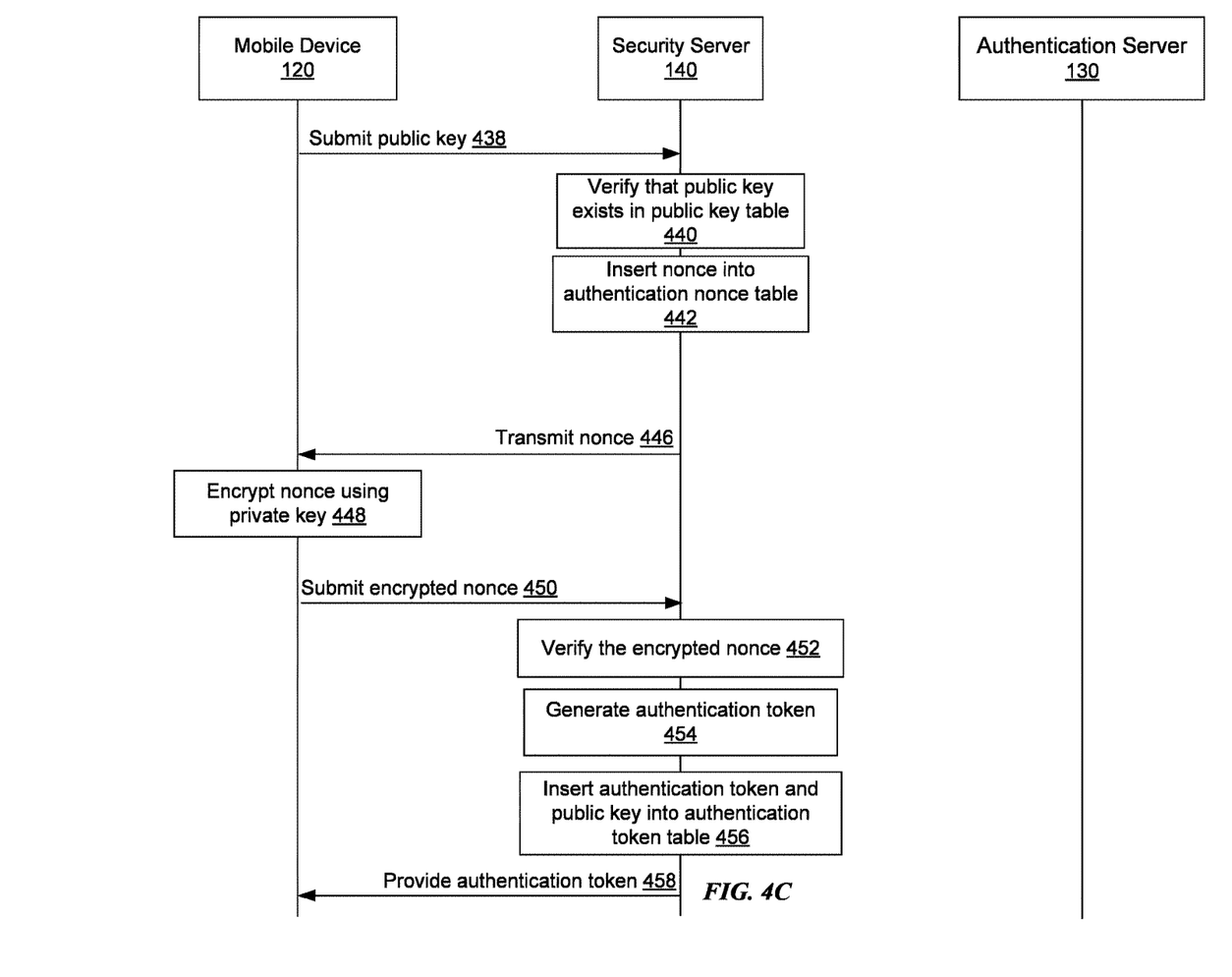

FIGS. 4A-C illustrate an interaction diagram depicting a computer-implemented process for mobile device authentication with blinded tokens, in accordance with some embodiments.

The process depicted in FIGS. 4A-C begins in FIG. 4A with mobile device 120 requesting 402 a service from authentication server 130. For example, mobile device 120 may request for a service that provides the mobile device with a cellular network. While mobile device 120 makes the request to authentication server 130, in some embodiments, authentication server 130 may not be the provider of the service. Rather, a third-party server or security server 140 may provide the service to the mobile device while the authentication server 130 provides confirmation that the request for the service was made. In some embodiments, mobile device 120 may transmit authentication information with the request for service. Authentication information may include information that may identify mobile device 120 or the user of mobile device 120, for example usernames, passwords, or electronic certificates.

In some embodiments, authentication server 130 may review the authentication information provided by the mobile device to verify that the information is accurate. The authentication server 130 may verify that the information is accurate by comparing the information to stored credential information (e.g., passwords, security codes, hashed information). In response to authenticating the mobile device 120 using the authentication information provided by the mobile device 120, authentication server 130 may randomly generate a receipt ID. Authentication server 130 transmits 404 the receipt ID to mobile device 120.

Upon receiving the receipt ID, mobile device 120 generates 406 a blinded token representative of the mobile device. The blinded token may be epoch-specific. In some embodiments, mobile device 120 may generate the blinded token through a blind signature scheme based on RSA signing. The blind signature scheme may utilize the following RSA parameters when generating the blinded token: a private exponent, d, known only to the signing server (in this case, security server 140), a public exponent, e, and public modulus, N. Mobile device 120 generates two random numbers, a first number, m, to use as a token and a second number, r, to blind the first number with. Mobile device 120 generates the second number, r, to be a random value that is relatively prime to N. The signing server may choose the private exponent, d, such that the following expression is true:

$$x^{ed} \equiv x (\text{mod } N) f \text{ or all } x \text{ in } [0,N)$$

Mobile device 120 blinds the first number, m, by computing the following expression:

$$m' \equiv mr^e (\text{mod } N)$$

where m' is the blinded first number (i.e., the blinded token), r is the second number, e is the public exponent, and N is the public modulus.

Mobile device 120 transmits 408 the blinded token and the receipt ID to security server 140. In some embodiments, mobile device 120 may also transmit a hash of a recovery ID (RID) and an external nullifier to security server 140. An external nullifier is a well-known public deterministic value. For example, the external nullifier could be the date of the transaction. Mobile device 120 may generate the recovery ID with a BIP39 (Bitcoin Improvement Proposal: 39) phrase, a seed phrase made up of 12 or 24 words that together represent a large randomly generated number. The hash of the RID and the external nullifier uniquely identifies a signal (e.g., the transmission 408) from an identity (e.g., mobile device 120) for a specific external nullifier, which ensures that the particular signal can only happen once.

Security server 140 verifies 410 that the receipt ID has not been used. In some embodiments, security server 140 may keep a table or blacklist of used receipt IDs and may verify the receipt ID by checking if the receipt ID exists in the table or blacklist. Security server 140 verifies the authenticity of the receipt ID with authentication server 130 by transmitting 412 a query to authentication server 130. Authentication server 130 validates 414 the receipt ID. Authentication server 130 may use any validation method to validate the receipt ID. In some embodiments, authentication server 130 may validate the receipt ID by checking a table of transmitted receipt IDs to see if the receipt ID exists in the table. Authentication server 130 transmits 416 the validated receipt ID to security server 140. Security server 140 stores 418 the validated receipt ID in a receipt authentication table. In some embodiments, security server 140 stores the hash of the RID and external nullifier with the receipt ID in the receipt authentication table.

Security server 140 encrypts 420 the blinded token. In some embodiments, security server 140 may encrypt the blinded token by cryptographically signing the blinded token (e.g., RSA signing). To RSA sign the blinded token, security server 140 may calculate the encrypted blinded token, s', as follows:

$$s' \equiv (m')^d (\text{mod } N)$$

where m' is the blinded token, d is the private exponent (known only to security server 140), and N is the public modulus. Security server 140 transmits 422 the encrypted blinded token, s', to mobile device 120.

Turning to the part of the process illustrated in FIG. 4B, mobile device 120 requests a validation of the encrypted blinded token from security server 140. In some embodiments, mobile device 120 may request a redemption of the blinded token in exchange for a performance of an action by an acting entity, such as security server 140. To request validation or redemption of the token, mobile device 120 generates 424 a public key and a private key. In some embodiments, mobile device 120 may generate the public key and private key based on the RID or external nullifier. Mobile device 120 may store the public key and private key.

Mobile device 120 unblinds 426 the encrypted blinded token. In some embodiments, mobile device 120 unblinds the encrypted blinded token by reversing the RSA signature using the following equation:

$$s \equiv s' \cdot r^{-1} \; (\text{mod } N)$$

where s is the encrypted unblinded token, s' is the encrypted blinded token, r is the second number, and N is the public modulus. Mobile device 120 transmits 428 the encrypted unblinded token and the public key to security server 140.

Security server 140 validates 430 that the encrypted unblinded token is not in a token blacklist. A token blacklist may be a list of tokens that have already been used, that have been revoked, or that otherwise aren't available for redemption. Security server 140 inserts 432 the public key into a public key table and inserts 434 the encrypted unblinded token into the token blacklist. In some embodiments, security server 140 transmits 436 a message to mobile device 120 that the public key was successfully inserted into the public key table.

Turning to the part of the process depicted in FIG. 4C, mobile device 120 submits 438 the public key to security server 140. Security server 140 verifies 440 that the public key exists in the public key table. Security server 140 inserts 442 a nonce into an authentication nonce table, where a nonce is a random number. In some embodiments, security server 140 may insert a hash of the nonce into the authentication nonce table along with the nonce itself. Security server 140 transmits 446 the nonce to mobile device 120.

Responsive to receiving the nonce from security server 140, mobile device 120 encrypts 448 the nonce using the private key that corresponds to the public key. Mobile device 120 submits 450 the encrypted nonce to security server 140. In some embodiments, mobile device 120 submits the public key as well as a hash of the nonce, where the hash of the nonce is encrypted with the private key.

The security server 140 verifies 452 the encrypted nonce or hash of the nonce by decryption using the public key, exposing the nonce or the hash of the nonce. Security server 140 verifies that the decrypted nonce itself or the decrypted hash of the nonce exists in the authentication nonce table. Security server 140 generates 454 an authentication token. Security server 140 inserts 456 the authentication token and the public key into an authentication token table. Security server 140 provides 458 the authentication token to mobile device 120.

Figure 5:
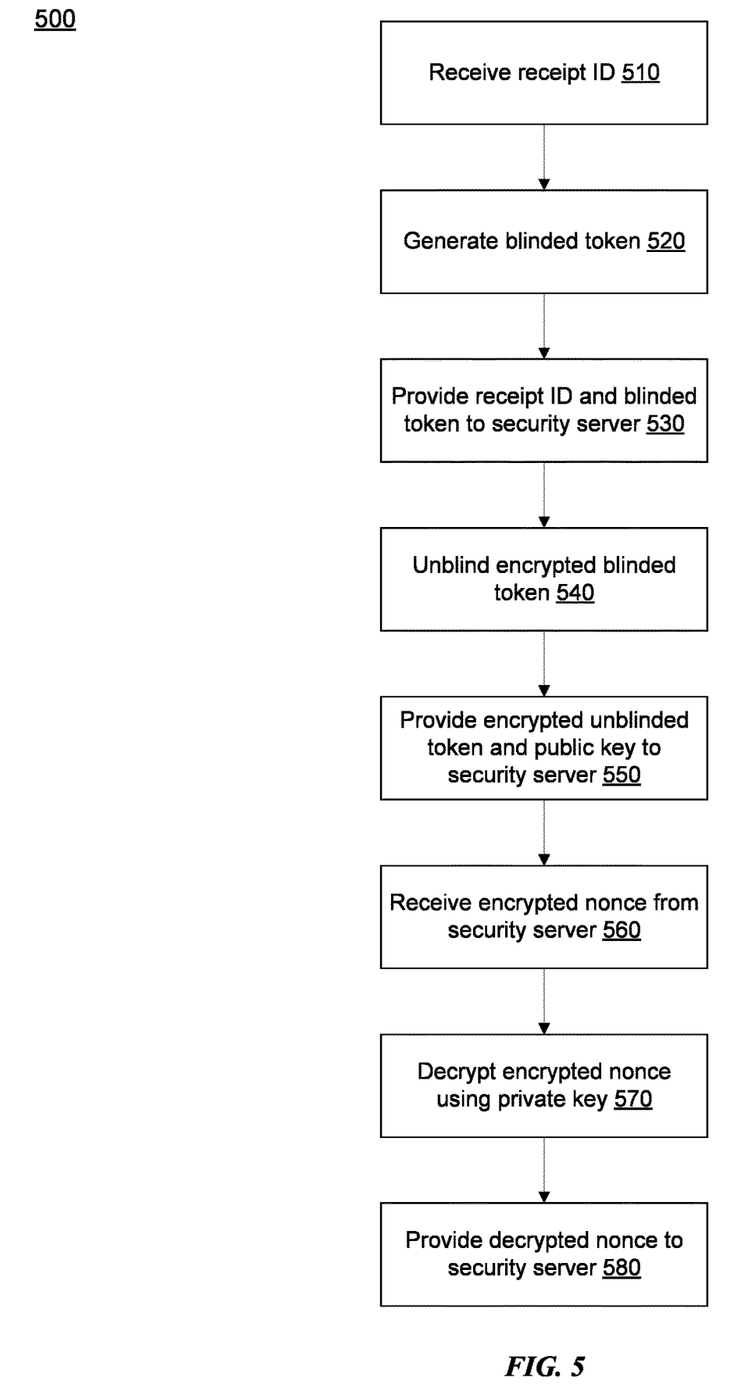
FIG. 5 depicts one embodiment of an exemplary process for mobile device authentication with blinded tokens.

FIG. 5 depicts one embodiment of an exemplary process for mobile device authentication with blinded tokens. Alternative embodiments may include more, fewer, or different steps from those illustrated in FIG. 5, and the steps may be performed in a different order from that illustrated in FIG. 5. In some embodiments, the steps of the method may be performed by a server, such as security server 140.

Process 500 starts when mobile device 120 receives 510 a receipt ID from authentication server 130 in response to providing authentication server 130 with authentication information. As described with respect to FIG. 4A, the receipt ID corresponds to a service requested by mobile device 120 and is a cryptographically secured value. Authentication information may include information that may be used to identify mobile device 120, for example a username or password.

Mobile device 120 generates 520 a blinded token representative of mobile device 120. As described with respect to FIG. 4A, mobile device 120 may generate the blinded token by using a blind signature scheme based on RSA signing, where mobile device 120 generates two random numbers, a first number to use as a token and a second number to blind the first number with.

Mobile device 120 provides 530 the receipt ID and blinded token to security server 140. As described with respect to FIG. 4A, in some embodiments, mobile device 120 may also transmit a hash of a recover ID (RID) and an external nullifier to security server 140.

Mobile device 120 unblinds 540 the encrypted blinded token. As described in FIG. 4B, in some embodiments, mobile device 120 may unblind the encrypted blinded token by reversing an RSA signature. Mobile device 120 provides 550 the encrypted unblinded token and public key to security server 140.

Mobile device 120 receives 560 the encrypted nonce from security server 140 and decrypts 570 the encrypted nonce from security server 140. As described in FIG. 4C, mobile device 120 may receive an encrypted hash of a nonce in addition to or instead of the encrypted nonce itself. Mobile device 120 decrypts the encrypted nonce or hash of the nonce using the private key stored by mobile device 120 and associated with the public key. Mobile device 120 provides 580 the decrypted nonce to security server 140.

IMSI Swapping Process

Figure 6:
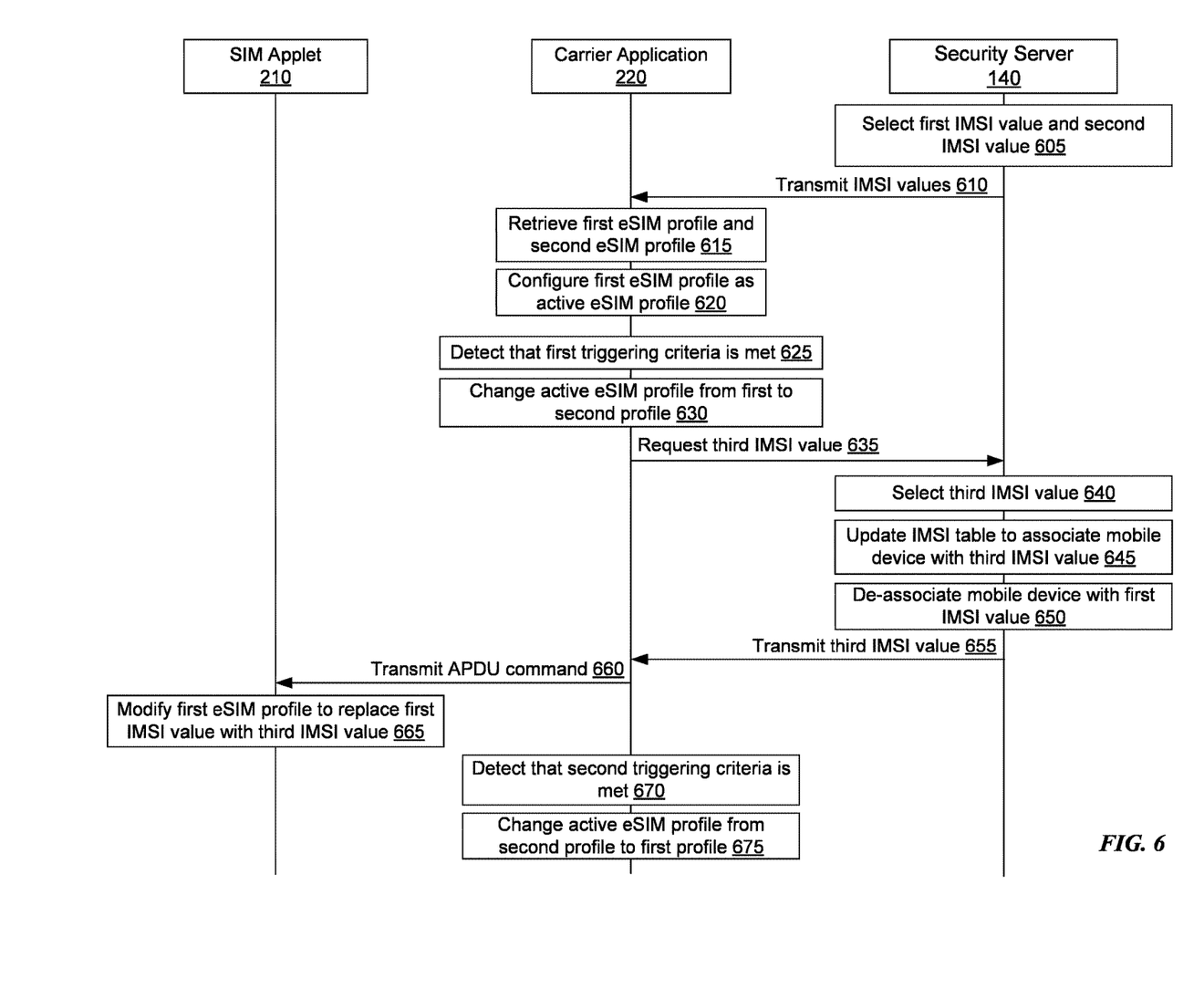
FIG. 6 is an interaction diagram depicting a computer-implemented process for swapping IMSI values on a mobile device in accordance with some embodiments.

FIG. 6 is an interaction diagram depicting a computer-implemented process for swapping IMSI values of a mobile device, in accordance with some embodiments.

The process depicted in FIG. 6 begins with security server 140 selecting 605 a first IMSI value and a second IMSI value. Security server 140 selects the IMSI values from a corpus of IMSI values. The corpus of IMSI values may be stored on security server 140, for example in IMSI value database 320. In some embodiments, responsive to selecting a first and second IMSI value, security server 140 removes the IMSI values from the corpus of IMSI values. Security server 140 transmits 610 the IMSI values to carrier application 220 on mobile device 120.

Carrier application 220 retrieves 615 first eSIM profile associated with the first IMSI value and a second eSIM profile associated with the second IMSI value. In some embodiments, carrier application 220 downloads eSIM profiles facilitated by backed services in security server 140. SIM applet 210 may associate the profiles with their respective IMSI values by updating a table on mobile device 120.

Carrier application 220 configures 620 the first eSIM profile as the active eSIM profile by selecting the first eSIM profile as the active eSIM profile. In some embodiments, carrier application 220 may configure 620 the first eSIM profile as the active eSIM profile by sending a command to SIM applet 210.

Carrier application 220 detects 625 that a first triggering criteria is met. In some embodiments, carrier application 220 detects that the triggering criteria is met by using a state machine. Carrier application 220 may input signals into the state machine and receive, as output, a state indicating that the triggering criteria is met or a state indicating that the triggering criteria is not met. Signals may include data associated with mobile device 120, for example a cell tower that mobile device 120 is communicatively coupled with, a location of mobile device 120, the active eSIM profile, or the IMSI value. Signals may include actions performed by mobile device 120, for example a receival or initiation of a call, an ending of a call, a sending of a text, a receival of a text, or a change in the IMSI value. Signals may include metadata associated with mobile device 120 and the IMSI swapping process, for example the number of actions performed by mobile device since swapping the IMSI value, or the time passed since swapping the IMSI value. In some embodiments, signals may include input from the user of mobile device 120, for example a request to swap IMSI values. The triggering criteria itself may simply be the result of detecting a signal, for example, a call ending or a user request to swap IMSI values. The triggering criteria may be a change in signals, such as if the mobile device switches from being communicatively coupled to a first cell tower to being communicatively coupled to a second cell tower. The triggering criteria may be when a signal has passed a threshold, for example if the number of actions performed by the mobile device using the same IMSI value has exceeded a threshold, or if the time since IMSI swapping has exceeded a threshold.

Responsive to detecting that the first triggering criteria is met, carrier application 220 changes 630 the active eSIM profile from the first profile to the second profile. In some embodiments, carrier application 220 changes 630 the active eSIM profile from the first to the second profile by sending a command to the mobile device 120. Carrier application 220 requests 635 a third IMSI value from security server 140, for instance in response to the active eSIM profile being switched, thus indicating that the first IMSI value is no longer being used.

Security server 140 selects 640 the third IMSI value from the corpus of IMSI values stored in IMSI value database 320. Security server 140 updates 645 an IMSI table to associate mobile device 120 with the third IMSI value and to de-associate 650 mobile device 120 with the first IMSI value. In some embodiments, updating 645 the IMSI table may include aligning the IMSI table entry for the third IMSI value with a set of keys (e.g., authentication vectors or K (secret key) and OPc (operator key) values) associated with the first IMSI value. Security server 140 transmits 655 the third IMSI value to carrier application 220.

Responsive to receiving the third IMSI value, carrier application 220 transmits 660 an APDU command to SIM applet 210 instructing SIM applet 210 to set the IMSI value within the first profile as the third IMSI value. Responsive to receiving the command, SIM applet 210 modifies 665 the first eSIM profile to replace the first IMSI value with the third IMSI value. In some embodiments, carrier application 220 may update an IMSI table indicating the IMSI values associated with the eSIM profiles on mobile device 120. In some embodiments, SIM applet 210 may issue a refresh command to refresh the first eSIM profile, during which the third IMSI value is associated with the first eSIM profile.

Carrier application 220 detects 670 that a second triggering criteria is met. In some embodiments, carrier application 220 may detect the second triggering criteria in the same way that carrier application 220 detected the first triggering criteria (e.g., using signals and a state machine). In some embodiments, the second criteria may be one of the first criteria. In some embodiments, the second triggering criteria may be the replacement of the first IMSI value with the third IMSI value in the first eSIM profile or the refresh of the first eSIM profile. Responsive to detecting that the second triggering criteria is met, carrier application 220 changes 675 the active eSIM profile from the second eSIM profile to the first eSIM profile. In some embodiments, carrier application 220 may change 675 the active eSIM profile from the second eSIM profile to the first eSIM profile by sending a command to SIM applet 210.

Figure 7:
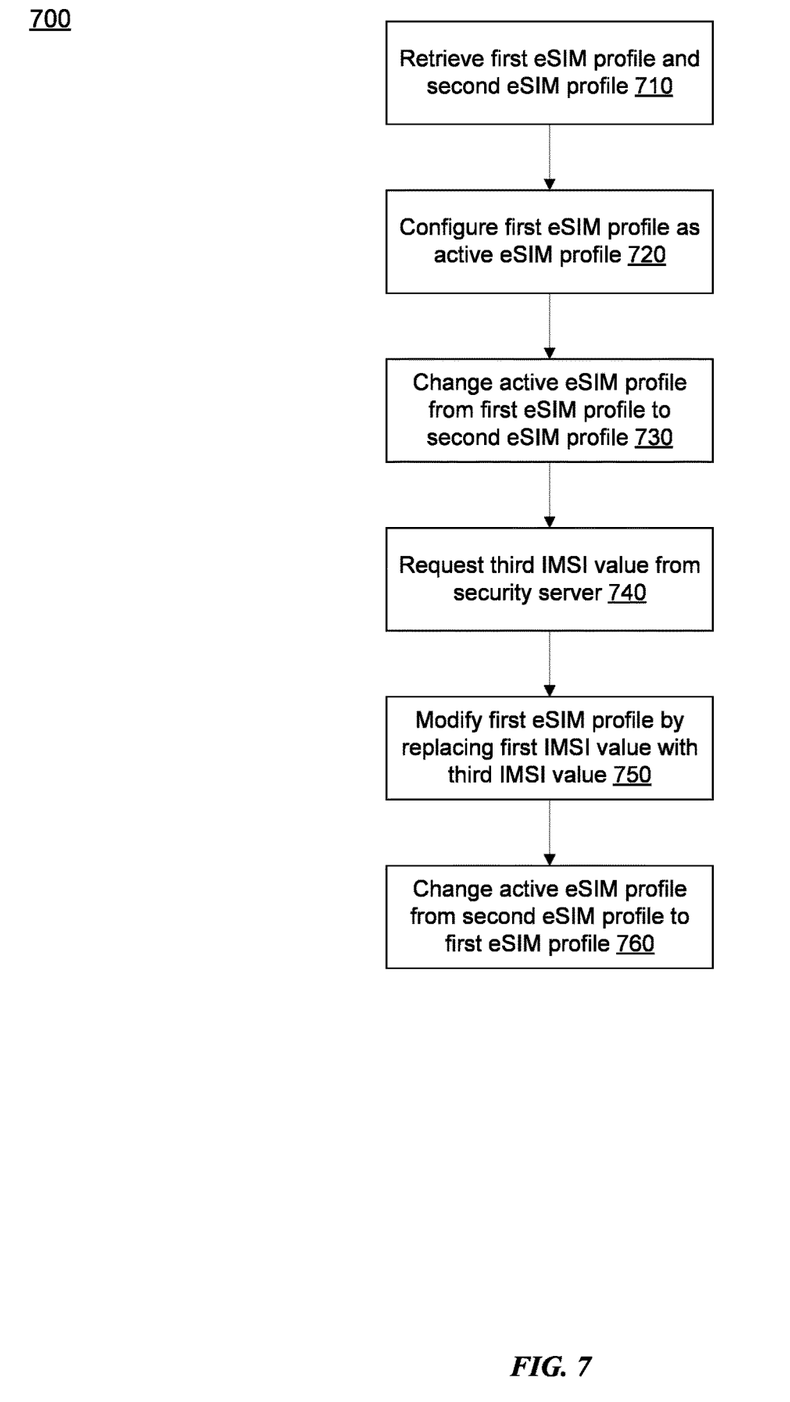
FIG. 7 depicts one embodiment of an exemplary process for swapping IMSI values on a mobile device.

FIG. 7 depicts one embodiment of an exemplary process for swapping IMSI values of a mobile device. Alternative embodiments may include more, fewer, or different steps from those illustrated in FIG. 7, and the steps may be performed in a different order from that illustrated in FIG. 7. In some embodiments, the steps of the method may be performed by a server, such as security server 140.

Process 700 starts when mobile device 120 retrieves 710 a first eSIM profile associated with a first IMSI value and a second eSIM profile associated with a second IMSI value, the first and second IMSI values received from security server 140 (described in FIG. 6). In some embodiments, retrieving the eSIM profiles may include adding them along with associated IMSI values to an IMSI table, for example the HSS or another IMSI or subscriber database.

Mobile device 120 configures 720 the first eSIM profile as the active eSIM profile by selecting the first eSIM profile as the active eSIM profile. In some embodiments, configuring the first eSIM profile as the active eSIM profile may include updating an entry in the IMSI table.

In response to a first triggering criteria, mobile device 120 changes 730 the active eSIM profile from the first eSIM profile to the second eSIM profile. In some embodiments, mobile device 120 changes the active eSIM profile from the first to the second eSIM profile by updating an entry in the IMSI table.

Mobile device 120 requests 740 a third IMSI value from security server 140 to replace the first IMSI value. As described with respect to FIG. 6, security server 140 may randomly select the third IMSI value from a corpus of IMSI values and may update an IMSI table to associate mobile device 120 with the third IMSI value and de-associate mobile device 120 with the first IMSI value.

In response to receiving the third IMSI value from security server 140, mobile device 120 modifies 750 the first eSIM profile by replacing the first IMSI value with the third IMSI value. In some embodiments, mobile device 120 may issue a refresh command to refresh the first eSIM profile.

In response to a second triggering criteria, mobile device 120 changes 760 the active eSIM profile from the second eSIM profile to the first eSIM profile. In some embodiments, mobile device 120 changes the active eSIM profile from the first to the second eSIM profile by updating an entry in the IMSI table.

Additional Configuration Considerations

Throughout this specification, many instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for mobile device authentication with blinded tokens and swapping the IMSI value of a mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   retrieving, by a mobile device, a first eSIM profile and a second eSIM profile, the first eSIM profile associated with a first IMSI value and the second eSIM profile associated with a second IMSI value, the first IMSI value and the second IMSI value received from a security server configured to randomly select the first IMSI value and the second IMSI value from a corpus of IMSI values;
   configuring, by the mobile device, an active eSIM profile for the mobile device by selecting the first eSIM profile as the active eSIM profile;
   in response to a first triggering criteria, changing, by the mobile device, the active eSIM profile from the first eSIM profile to the second eSIM profile;
   requesting, by the mobile device, a third IMSI value from the security server to replace the first IMSI value, the security server configured to randomly select the third IMSI value from the corpus of IMSI values and to update an IMSI table to associate the mobile device with the third IMSI value and to de-associate the mobile device with the first IMSI value;
   in response to receiving the third IMSI value from the security server, modifying, by the mobile device, the first eSIM profile by replacing the first IMSI value with the third IMSI value within the first eSIM profile; and
   in response to a second triggering criteria, changing, by the mobile device, the active eSIM profile from the second eSIM profile to the first eSIM profile.

2. The method of claim 1, wherein the security server is associated with a set of mobile devices including the mobile device, wherein the corpus of IMSI values comprises IMSI values available to the set of mobile devices, and wherein there are more IMSI values in the corpus of IMSI values than mobile devices in the set of mobile devices.

3. The method of claim 1, wherein one or both of the first triggering criteria and the second triggering criteria comprises a call ending.

4. The method of claim 1, wherein one or both of the first triggering criteria and the second triggering criteria comprises the mobile device switching from being communicatively coupled to a first cell tower to being communicatively coupled to a second cell tower.

5. The method of claim 1, wherein one or both of the first triggering criteria and the second triggering criteria comprises the mobile device performing a threshold number of actions using a same IMSI value.

6. The method of claim 1, wherein one or both of the first triggering criteria and the second triggering criteria comprises a passage of a threshold interval of time.

7. The method of claim 1, wherein retrieving the first eSIM profile and the second eSIM profile comprises selecting the first IMSI value and the second IMSI value from a set of IMSI values previously provided by the security server to the mobile device.

8. A non-transitory computer-readable medium comprising memory with instructions encoded thereon, the instructions, when executed by one or more processors, causing the one or more processors to perform operations, the instructions comprising instructions to:
   retrieve, by a mobile device, a first eSIM profile and a second eSIM profile, the first eSIM profile associated with a first IMSI value and the second eSIM profile associated with a second IMSI value, the first IMSI value and the second IMSI value received from a security server configured to randomly select the first IMSI value and the second IMSI value from a corpus of IMSI values;
   configure, by the mobile device, an active eSIM profile for the mobile device by selecting the first eSIM profile as the active eSIM profile;
   in response to a first triggering criteria, change, by the mobile device, the active eSIM profile from the first eSIM profile to the second eSIM profile;
   request, by the mobile device, a third IMSI value from the security server to replace the first IMSI value, the security server configured to randomly select the third IMSI value from the corpus of IMSI values and to update an IMSI table to associate the mobile device with the third IMSI value and to de-associate the mobile device with the first IMSI value;
   in response to receiving the third IMSI value from the security server, modify, by the mobile device, the first eSIM profile by replacing the first IMSI value with the third IMSI value within the first eSIM profile; and
   in response to a second triggering criteria, change, by the mobile device, the active eSIM profile from the second eSIM profile to the first eSIM profile.

9. The non-transitory computer-readable medium of claim 8, wherein the security server is associated with a set of mobile devices including the mobile device, wherein the corpus of IMSI values comprises IMSI values available to the set of mobile devices, and wherein there are more IMSI values in the corpus of IMSI values than mobile devices in the set of mobile devices.

10. The non-transitory computer-readable medium of claim 8, wherein one or both of the first triggering criteria and the second triggering criteria comprises a call ending.

11. The non-transitory computer-readable medium of claim 8, wherein one or both of the first triggering criteria and the second triggering criteria comprises the mobile device switching from being communicatively coupled to a first cell tower to being communicatively coupled to a second cell tower.

12. The non-transitory computer-readable medium of claim 8, wherein one or both of the first triggering criteria and the second triggering criteria comprises the mobile device performing a threshold number of actions using a same IMSI value.

13. The non-transitory computer-readable medium of claim 8, wherein one or both of the first triggering criteria and the second triggering criteria comprises a passage of a threshold interval of time.

14. The non-transitory computer-readable medium of claim 8, wherein the instructions for retrieving the first eSIM profile and the second eSIM profile comprise instructions that cause the one or more processors to select the first IMSI value and the second IMSI value from a set of IMSI values previously provided by the security server to the mobile device.

15. A system comprising:
a processor; and
a non-transitory computer-readable medium storing instructions that, when executed by the processor, cause the processor to:
retrieve, by a mobile device, a first eSIM profile and a second eSIM profile, the first eSIM profile associated with a first IMSI value and the second eSIM profile associated with a second IMSI value, the first IMSI value and the second IMSI value received from a security server configured to randomly select the first IMSI value and the second IMSI value from a corpus of IMSI values;
configure, by the mobile device, an active eSIM profile for the mobile device by selecting the first eSIM profile as the active eSIM profile;
in response to a first triggering criteria, change, by the mobile device, the active eSIM profile from the first eSIM profile to the second eSIM profile;
request, by the mobile device, a third IMSI value from the security server to replace the first IMSI value, the security server configured to randomly select the third IMSI value from the corpus of IMSI values and to update an IMSI table to associate the mobile device with the third IMSI value and to de-associate the mobile device with the first IMSI value;
in response to receiving the third IMSI value from the security server, modify, by the mobile device, the first eSIM profile by replacing the first IMSI value with the third IMSI value within the first eSIM profile; and
in response to a second triggering criteria, change, by the mobile device, the active eSIM profile from the second eSIM profile to the first eSIM profile.

16. The system of claim 15, wherein the security server is associated with a set of mobile devices including the mobile device, wherein the corpus of IMSI values comprises IMSI values available to the set of mobile devices, and wherein there are more IMSI values in the corpus of IMSI values than mobile devices in the set of mobile devices.

17. The system of claim 15, wherein one or both of the first triggering criteria and the second triggering criteria comprises a call ending.

18. The system of claim 15, wherein one or both of the first triggering criteria and the second triggering criteria comprises the mobile device switching from being communicatively coupled to a first cell tower to being communicatively coupled to a second cell tower.

19. The system of claim 15, wherein one or both of the first triggering criteria and the second triggering criteria comprises the mobile device performing a threshold number of actions using a same IMSI value.

20. The system of claim 15, wherein one or both of the first triggering criteria and the second triggering criteria comprises a passage of a threshold interval of time.

* * * * *